United States Patent [19]
Simpson

[11] 3,782,494
[45] Jan. 1, 1974

[54] AIR CUSHION VEHICLE SEAL

[75] Inventor: Anthony Yelverton Simpson, New Orleans, La.

[73] Assignee: Textron Inc., Providence, R.I.

[22] Filed: May 25, 1972

[21] Appl. No.: 256,653

[52] U.S. Cl.............................. 180/124, 180/128
[51] Int. Cl............................................. B60v 1/16
[58] Field of Search ........................... 180/116–130

[56] References Cited
UNITED STATES PATENTS

| | | | |
|---|---|---|---|
| 3,618,695 | 11/1971 | Wheeler | 180/128 |
| 3,536,156 | 10/1970 | Crago | 180/128 |
| 3,398,809 | 8/1968 | Wood | 180/124 |
| 3,643,758 | 2/1972 | Winter | 180/128 |
| 3,478,836 | 11/1969 | Eckered | 180/128 |

Primary Examiner—Kenneth H. Betts
Assistant Examiner—Terrance L. Siemens
Attorney—John B. Bean et al.

[57] ABSTRACT

A system for bracing/stiffening any side section, such as the bow section of an air cushion vehicle seal of the inflated bag or trunk type against "plow-in" or "tuck-under" tendencies. The system provides (without undue outward extension of the vehicle deck) a "third stage" extension to the conventional "two-stage stiffness" bag type air cushion seal, whereby a new and improved "three-stage stiffness" seal system is provided. Also, the device of the invention incidentally operates as a novel pneumatic bumper device protecting the vehicle hard structure against damage when docking or the like.

10 Claims, 3 Drawing Figures

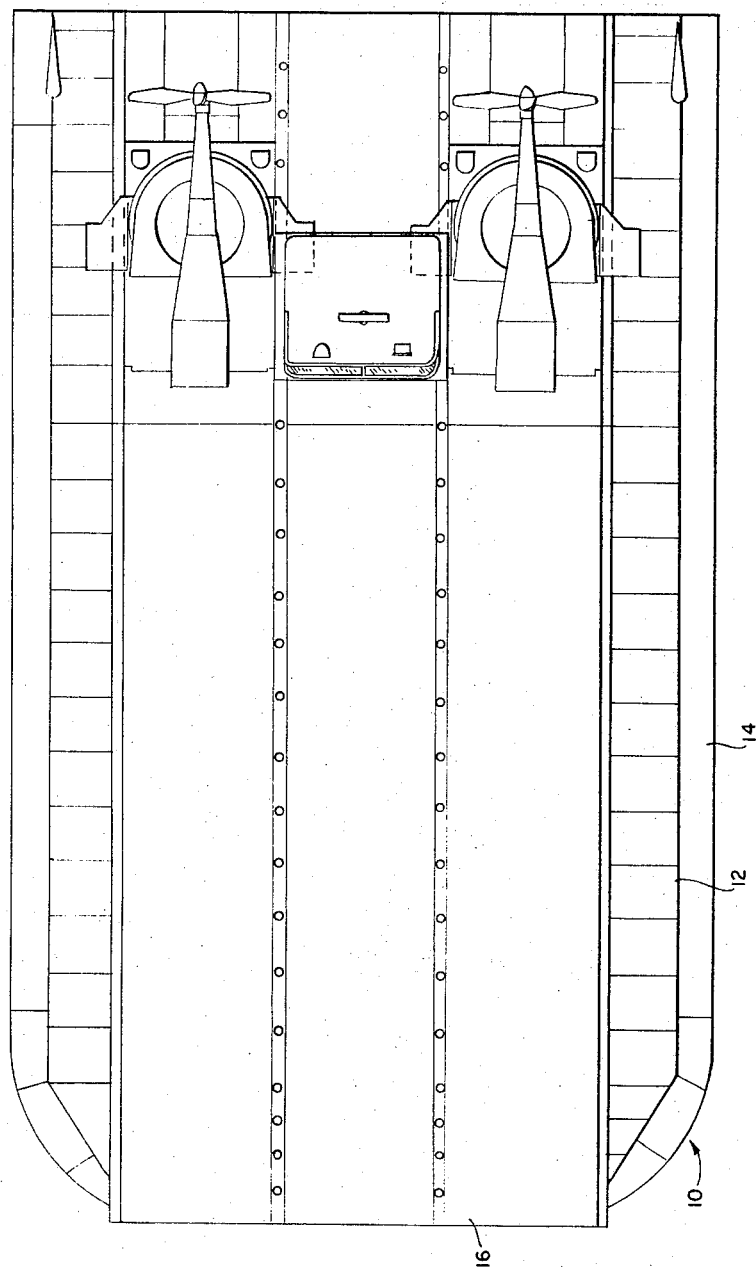

AIR CUSHION VEHICLE SEAL

BACKGROUND AND OBJECTS OF THE INVENTION

The invention relates to vehicles of the so-called surface effect type; that is, to vehicles designed for travelling over any surface, and which when in operation are supported above the surface (at least in part) by a cushion of pressurized gas such as air. Such vehicles, particularly those of the type which involve travel over rough water surfaces confront difficult seal "tuck-under" and vehicle "plow-in" problems with respect for example to the bow seal section when running "against the sea," and with respect to the side seal sections when operating in the presence of a "beam sea." Typically, the bow seal problem has heretofore been reduced by rounding the plan-view profile of the bow section of the air cushion seal system, whereby so-called "hoop" or "catenary" tension forces existent throughout the inflated and rounded bow portion of the seal bag structure operate to resist such tuck-under tendencies. However whenever the planform dimensional limitations for the vehicle precludes such an extension (such as when the vehicle must be designed to fit into a mother ship or other carrier) such proposals are unacceptable; and the present invention meets this problem without undesirable extension of the vehicle hard structure planform.

THE DRAWING

By way of one example, the invention is illustrated in the accompanying drawing, wherein:

FIG. 3 is a top plan view of the vehicle of FIG. 1.

Figure 1:
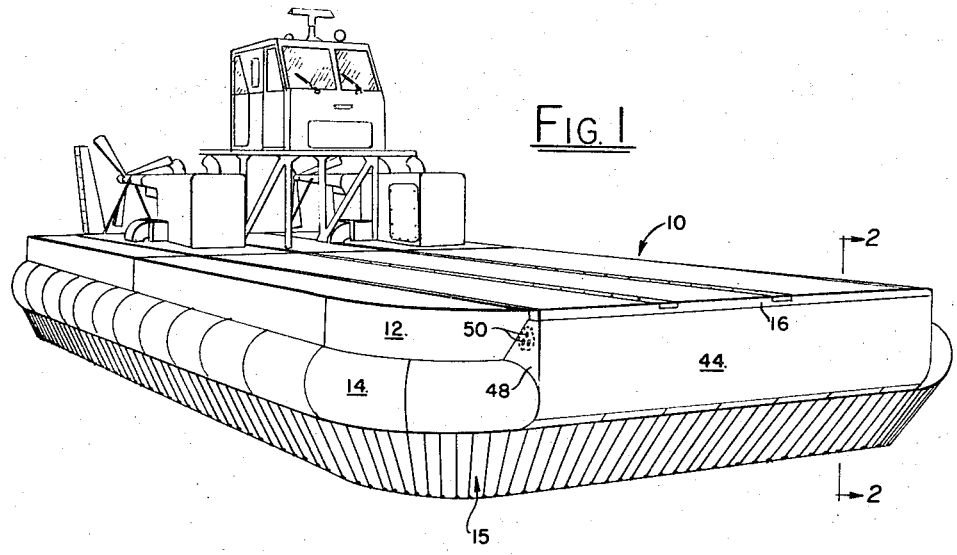
FIG. 1 is a perspective view of an air cushion vehicle embodying a device of the present invention.

The invention may be embodied in a surface effect vehicle of the type shown and designated generally at 10, which is adapted to be supported above a reaction surface by a cushion of pressurized air formed beneath the vehicle "hard structure" or body portion 12. The support air cushion is contained thereunder at least in part by a marginal "seal" system comprising as shown by way of example herein an inflatable bag 14 having a series of "finger" type seal devices 15 attached to and depending therebelow. It is to be understood, however, that the specific plan-form and component constructions thereof and/or dimensional and functional aspects of the arrangement as shown by the drawing herein may be modified in various ways, as may be preferred.

Figure 2:
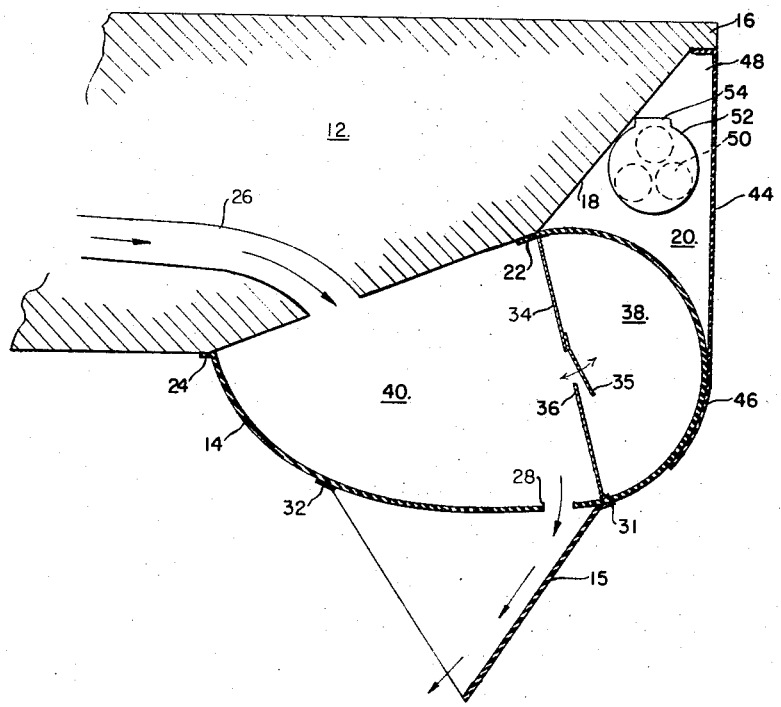
FIG. 2 is a fragmentary, enlarged scale, sectional view taken as suggested by line 2—2 of FIG. 1.

Thus, as illustrated by the drawing herewith, the bow section of the hard structure of the vehicle may be "squared off" (rather than rounded) as shown at 16 (FIGS. 1 and 3) and therefore shortened to advantage as explained hereinabove, while being undercut as shown at 18 (FIG. 2) to provide space therebelow for an air receiving cell or chamber 20 under the bow of the vehicle, as will be explained more fully hereinafter. As shown at FIG. 2, the bag device 14 is attached to the vehicle hard structure as by means of any suitable connections as indicated at 22 and 24, so as to balloon outwardly and downwardly therefrom when inflated via an air supply duct 26.

As illustrated at 28 the "primary seal" bag 14 is perforated to provide airflow communication between the bag and a series of "secondary seal" fingers 15 which are connected to the bag as indicated at 31–32 so as to depend therebelow. Also, the interior of the bag 14 is functionally divided by a flexible partition 34 to provide a "two-stage stiffness" seal system as previously disclosed for example in U.S. Pat. No. 3,618,695. As shown at FIG. 2 of the drawing herewith, a one-way check valve device 35 is employed to cover an aperture 36 through the partition 34; whereby the bag section 38 at one side of the partition is maintained under air pressure at least equal to or higher than the air pressure within the opposite bag section 40. Thus, a so-called "two-stage stiffness" primary bag and secondary finger seal system is provided.

However, in accordance with the present invention the frontal portion of the bag 14 under the bow of the vehicle is located so as to terminate substantially tangential to the vertical plane of the leading edge portion 16 of the vehicle hard structure. A flexible airtight apron device as shown at 44 is disposed to extend across the entire front section of the vehicle; being attached along its upper edge to the leading edge portion 16 thereof and along its lower edge to the frontal portion of the bag 14 as indicated at 46 (FIG. 2). The apron system may however be extended around the corners of the vehicle and along the sides and/or across the stern if desired, to attain the preferred operational characteristics. The apron attachments may be effected by any suitable mechanical or adhesive devices or the like, or any combinations thereof.

Again, referring to the drawing herewith, at the opposite ends of the apron 44 the space 20 behind the apron is closed by means of flexible airtight end panels 48. The closed air cell 20 thus formed by the apron 44; the end panels 48—48; the top portion of the bag 14; and the vehicle hard structure 18 is provided with means for maintaining it normally at the ambient air pressure, whereby the closed air cell thus provided behind the apron 44 functions to pneumatically resist deflections of the apron member 44 from the normal attitude and condition thereof as shown in FIG. 2. Thus, it will be understood that the apron 44 functions as a flexible suspension for the outwardly protruding portion of the bag 14, resisting any downwardly deflecting tendencies thereof (such as in response to wave impacts). Also, the air enclosed within the cell 20 operates to pneumatically resist any rearward deflections of the apron 44. Hence, it will be understood that the pneumatic cell device 20 complements the "two-stage stiffness" bag device per se, and functionally integrates therewith to provide a primary "three-stage stiffness" system resisting tuck-under tendencies of the primary bag and secondary seal system when the vehicle is operating against rough water wave conditions. Also, the cell 20 provides a pneumatic cushion alleviating wave impact effects on the vehicle.

To ensure maintenance of a suitable air pressure condition within the cell 20, air inlet apertures as indicated at 50 may be provided through the end panels 48 and arranged to be controlled by one-way check valve devices as indicated at 52. By way of example, the valve devices 52 may each comprise a rubber flap hingedly mounted on the end panel 48 as indicated at 54. The valves are thus so disposed as to automatically close to prevent expulsion of air through the apertures 50, while opening automatically to permit ingress of air from the ambient atmosphere whenever the cell pressure falls therebelow. However, in some cases it may be preferred to provide for a separate supply of air to the cell 20 (from the vehicle compressed air supply system) at higher than atmospheric pressure but at lower than the pressure within the cell 38. Also, it is to be understood that the valves 52 may be arranged to be pilot-controlled instead of automatically operating as shown herein.

It is to be noted that during a vehicle docking maneuver or the like the air cell 20 is adapted to function as an efficient pneumatic "bumper" for protecting the vehicle hard structure from damage. In any event if air is forced out of the cell incidental to such an operation, or otherwise leaks therefrom it will be subsequently replaced either automatically from the ambient atmosphere simply by operation of the valve 52 or by operation of a pilot-controlled valve, as explained hereinabove. Therefore it will be appreciated that the invention provides a novel three-stage stiffness bag type primary seal system which is operative to provide improved behavior characteristics under wave/obstacle impact conditions, in that impact effects taken against the apron will be progressively transmitted through the system while being dissipated.

I claim:

1. In an air cushion vehicle an air cushion seal assembly comprising in combination, an inflatable bag attached to and extending downwardly from the vehicle hard structure to thereby provide a primary air-cell means, a flexible apertured partition device dividing said bag into two compartments and thereby providing a "two-stage stiffness" air cell system including a first cell and a second cell, and a flexible airtight apron device extending along the vehicle and attached along its upper edge to a perimetral portion of the hard structure of said vehicle and along its lower edge to the outer portion of said bag and having flexible airtight end closure means thereby defining in combination with the hard structure and said bag a third air cell.

2. In an air cushion vehicle having an air cushion seal assembly as set forth in claim 1, wherein a secondary seal device is attached to depend below said bag.

3. In an air cushion vehicle having an air cushion seal assembly as set forth in claim 1, wherein said apron device is disposed in a substantially vertical attitude.

4. In an air cushion vehicle having an air cushion seal assembly as set forth in claim 3, whereby said apron device provides resistance against downward and inward deflection of said bag.

5. In an air cushion vehicle having an air cushion seal assembly as set forth in claim 1, wherein the bow portion of the vehicle hard structure is of square ended planform.

6. In an air cushion vehicle having an air cushion seal assembly as set forth in claim 1, wherein a valve is provided in conjunction with the apertured portion of said partition device, said valve being automatically operable to maintain the air within said second cell at a pressure at least as high as the pressure within said first cell.

7. In an air cushion vehicle having an air cushion seal assembly as set forth in claim 1, wherein a control means is provided normally to maintain a supply of air within said third air cell at a pressure lower than the air pressure within said second cell.

8. In an air cushion vehicle having an air cushion seal assembly as set forth in claim 7, wherein said control means comprises a one-way automatically operating check valve controlled air inlet for air from the outside atmosphere.

9. In an air cushion vehicle having an air cushion seal assembly as set forth in claim 8, wherein a secondary seal device is attached to depend below said bag.

10. In an air cushion vehicle having a body presenting marginally extending hard structure, in combination:
air cushion confining means attached to said hard structure for forming a depending skirt circumscribing an air cushion beneath the vehicle, said air cushion confining means including an inflatable, flexible bag extending lengthwise to form at least a portion of said skirt, a flexible partition device dividing said bag into lengthwise extenting inner and outer air cells, said partition device including check valve means allowing air flow from said inner cell to said outer cell, and said inner cell having air discharge opening means along its bottom and inwardly of said partition to allow air escape into the air cushion space;
means for supplying air under pressure into said inner cell whereby to inflate both said inner and said outer cell and create a two-stage stiffness effect for said air cushion confining means as between said inner and outer cells;
said air cushion confining means also including a flexible airtight apron extending along the vehicle outwardly of said bag and attached respectively along its upper and lower edges to said vehicle and to said bag to define a third air cell inwardly of the apron and in cooperation with the outer surface of the vehicle and said bag; and
means for maintaining said third air cell normally under internal pressure different from those air pressures in the inner and outer cells whereby to create a third stage stiffness effect for said air cushion confining means.

* * * * *